(12) United States Patent
Ishii et al.

(10) Patent No.: US 8,005,440 B2
(45) Date of Patent: Aug. 23, 2011

(54) MOBILE STATION APPARATUS AND CONTROL METHOD FOR THE MOBILE STATION APPARATUS

(75) Inventors: Hiroyuki Ishii, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 910 days.

(21) Appl. No.: 11/331,200

(22) Filed: Jan. 13, 2006

(65) Prior Publication Data

US 2006/0176858 A1  Aug. 10, 2006

(30) Foreign Application Priority Data

Jan. 13, 2005 (JP) ............... P2005-006603
Jan. 11, 2006 (JP) ............... P2006-004200

(51) Int. Cl.
*H03C 7/02* (2006.01)
*H04B 1/02* (2006.01)
*H04B 7/02* (2006.01)

(52) U.S. Cl. .............. 455/101; 455/562.1; 455/69
(58) Field of Classification Search .......... 455/67.1, 455/69, 562.1, 423, 101; 375/265
See application file for complete search history.

(56) References Cited

U.S. PATENT DOCUMENTS

| | | | |
|---|---|---|---|
| 6,584,161 B2 * | 6/2003 | Hottinen et al. ........... 375/299 |
| 6,611,675 B1 * | 8/2003 | Salonen et al. ........... 455/69 |
| 6,839,326 B1 * | 1/2005 | Pajukoski et al. ........... 370/252 |
| 6,922,560 B1 * | 7/2005 | Zhang ........... 455/423 |
| 7,116,944 B2 * | 10/2006 | Das et al. ........... 455/69 |
| 7,395,032 B2 * | 7/2008 | Kaipainen et al. ........... 455/101 |
| 2002/0186785 A1 | 12/2002 | Hoshino et al. |
| 2003/0003873 A1 * | 1/2003 | Raghothaman ........... 455/67.1 |
| 2003/0142755 A1 * | 7/2003 | Chi et al. ........... 375/265 |
| 2004/0077378 A1 * | 4/2004 | Kim et al. ........... 455/562.1 |
| 2005/0250524 A1 * | 11/2005 | Nilsson et al. ........... 455/509 |
| 2006/0068791 A1 * | 3/2006 | Lindoff ........... 455/442 |
| 2006/0172776 A1 * | 8/2006 | Han ........... 455/562.1 |
| 2008/0064408 A1 * | 3/2008 | Lindoff ........... 455/442 |

FOREIGN PATENT DOCUMENTS

| | | |
|---|---|---|
| CN | 1358357 A | 7/2002 |
| CN | 1496143 A | 5/2004 |
| DE | 102 20 930 A1 | 11/2003 |
| EP | 1 156 597 A1 | 11/2001 |
| JP | 2004-179931 | 6/2004 |
| WO | WO 2004/075434 A1 | 9/2004 |

OTHER PUBLICATIONS

"Closed Loop Mode Transmit Diversity", (Release 5), 3GPP, TS 25.214 V5.8.0, Mar. 2004, pp. 44-52 and pp. 55-57.

(Continued)

*Primary Examiner* — Christian A Hannon
(74) *Attorney, Agent, or Firm* — Oblon, Spivak, McClelland, Maier & Neustadt, L.L.P.

(57) ABSTRACT

A mobile station apparatus communicates with a wireless base station apparatus to which closed-loop transmission diversity control is applied, the closed-loop transmission diversity control controlling phases of signals transmitted from two antennas based upon feedback information notified by the mobile station apparatus and transmitting the signals. The mobile station apparatus includes a control unit which determines whether to reflect an estimated phase result of the signals transmitted from the two antennas or not, depending on a channel type of signals transmitted from the wireless base station apparatus.

9 Claims, 6 Drawing Sheets

OTHER PUBLICATIONS

"3$^{rd}$ Generation Partnership Project; Technical Specification Group Radio Access Network; Physical Layer Aspects of UTRA High Speed Downlink Packet Access", (Release 4), 3GPP, TR 25.848 V4.0.0, Mar. 2001, pp. 1-89.

"Universal Mobile Telecommunications System (UMTS); Physical Layer Procedures (FDD) (3GPP TS 25.214 Version 6.4.0 Release 6)", ETSI TS 125 214, ETSI Standards, vol. 3-R1, No. V6.4.0, XP014027622, Dec, 1, 2004, 69 pages.

U.S. Appl. No. 11/330,346, filed Jan. 12, 2006, Ishii, et al.

U.S. Appl. No. 11/780,961, filed Jul. 20, 2007, Ishii et al.

Office Action issued on Aug. 4, 2010, in Chinese Patent Application No. 200610001162.2 (with English Translation).

Office Action issued Oct. 5, 2010, in Japanese Patent Application No. 2006-004200, with English language translation.

Chinese Office Action (with English translation) issued on Jan. 19, 2011, in counterpart Chinese Patent Application No. 200610001162.2 (10 pages).

\* cited by examiner

MOBILE STATION APPARATUS AND CONTROL METHOD FOR THE MOBILE STATION APPARATUS

CROSS REFERENCE TO RELATED APPLICATIONS

This application is based upon and claims the benefit of priority from prior Japanese Patent Application P2005-006603 filed on Jan. 13, 2005 and Japanese Patent Application P2006-004200 filed on Jan. 11, 2006; the entire contents of which are incorporated by reference herein.

BACKGROUND OF THE INVENTION

1. Field of the Invention

The present invention relates to a mobile station apparatus and a control method for the mobile station apparatus and particularly to a mobile station apparatus, which performs wireless communication in which transmission diversity is applied, and a control method for the same.

2. Description of the Related Art

During wireless communication, a phenomenon called "fading" generally occurs and transmission performances, that is, bit error rate characteristics are greatly deteriorated by fading.

A generally-known method for compensating such deterioration of transmission performances caused by fading is "transmission diversity." Following is a description of a type of transmission diversity called "closed-loop transmission diversity mode 1." (For example, see 3GPP "TS25.214 V5.8.0 Physical layer procedures (FDD).")

Figure 1:
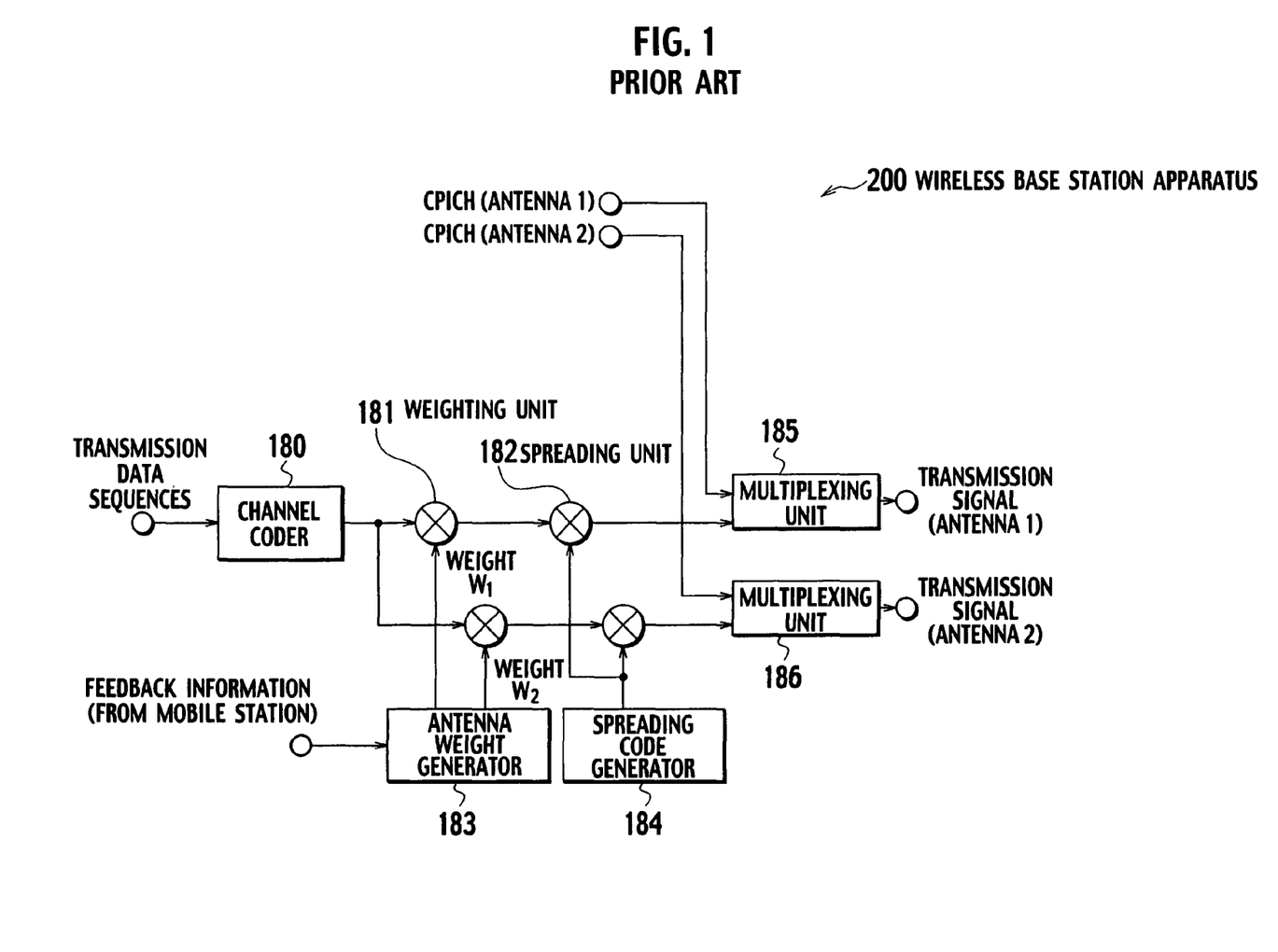
FIG. 1 is a structural block diagram of a transmission unit of conventional closed-loop transmission diversity.
Figure 2:
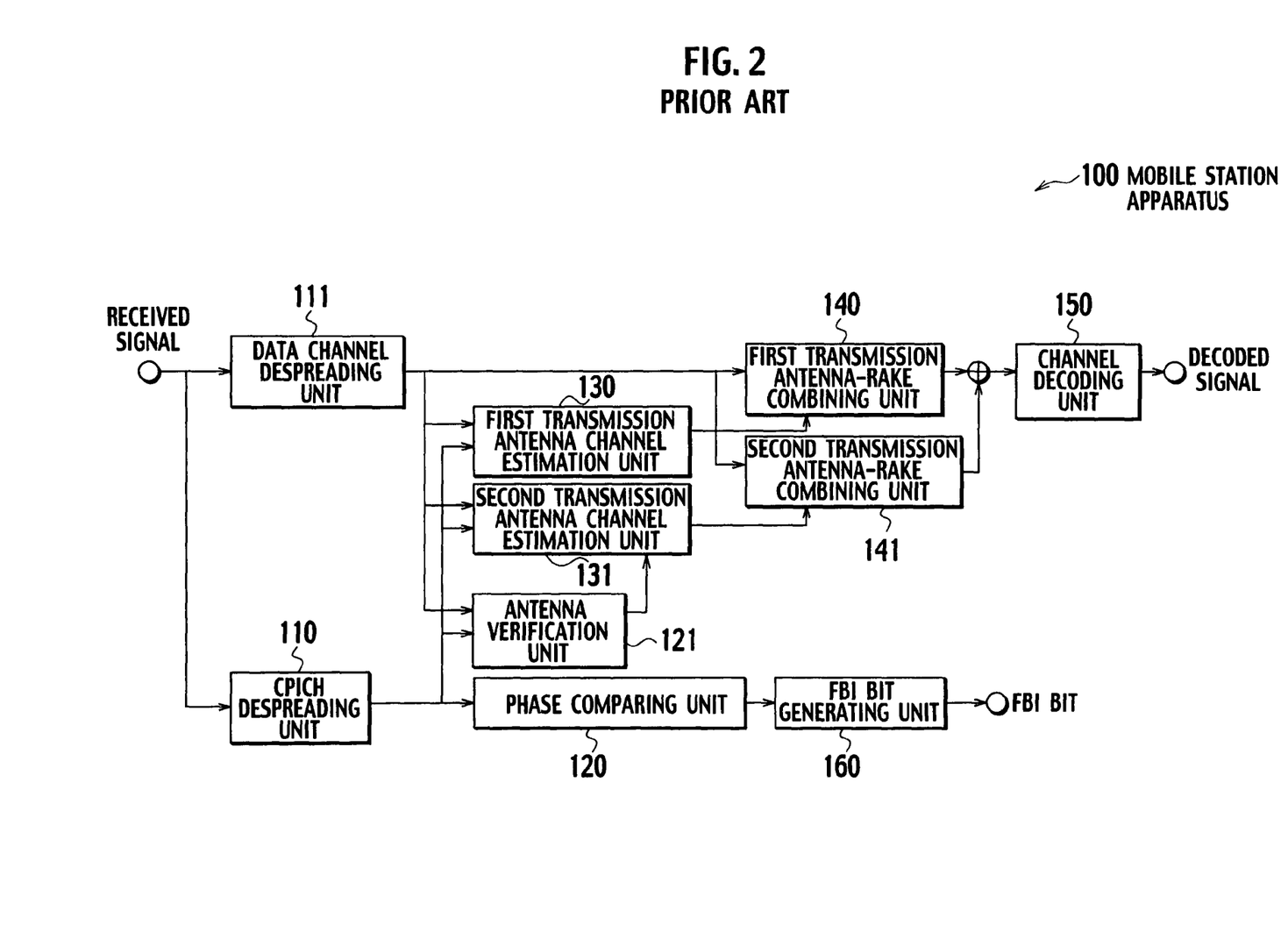
FIG. 2 is a structural block diagram of a receiving unit of the conventional closed-loop transmission diversity.

FIG. 1 shows a construction of a wireless base station apparatus (a transmission unit) and FIG. 2 shows a construction of a mobile station apparatus (a receiving unit), both in closed-loop transmission diversity.

As shown in FIG. 1, in the wireless base station apparatus 200 (the transmission unit), an antenna weight generator 183 generates complex weights:

$$W_1 = A_1 e^{j\phi_1}$$

$$W_2 = A_2 e^{j\phi_2}$$

based upon feedback information (FBI) bits from the mobile station apparatus 100. Thereafter, a weighting unit 181 multiplies two transmission data sequences coded by a channel coder 180 with the complex weights:

$$W_1 = A_1 e^{j\phi_1}$$

$$W_2 = A_2 e^{j\phi_2}$$

A spreading unit 182 then carries out a spreading process using a spreading code generated by a spreading code generator 184.

Thereafter, two antennas transmit CPICHs (Common Pilot Channels) with the same carrier phase. The CPICHs transmitted from the two antennas are spread with the same spreading code and orthogonalization is realized by changing pilot symbols.

Meanwhile, as shown in FIG. 2, in the mobile station apparatus 100 (the receiving unit), a CPICH despreading unit 110 despreads the CPICHs transmitted by the two antennas, and a phase comparing unit 120 compares a received carrier phase difference between the separated signals. Thereafter, a FBI bit generating unit 160 generates a FBI bit which controls the receipt carrier phase difference and transmits the FBI bit through a DPCCH (Dedicated Physical Control Channel), one of dedicated uplink physical channels DPCHs (Dedicated Physical Channels).

The wireless base station apparatus 200 (the transmission unit) multiplies transmission data sequences of the two antennas with transmission antenna weights generated based upon the FBI bit from the mobile station apparatus 100, and transmits the multiplied transmission data sequences. As stated above, transmission carrier phases of two antennas are controlled by using a FBI bit from the mobile station apparatus, thus reducing bit errors attributed to a decline in received signals power due to fading.

The closed-loop transmission diversity mode 1 specified by 3GPP is a method for controlling a transmission carrier phase of a dedicated physical channel DPCH for the second antenna with a carrier phase resolution of $\pi/4$ so that signals from the two antennas and received at the mobile station have almost the same phase. Further descriptions are given below regarding operations when the closed-loop transmission diversity mode 1 is applied to the dedicated physical channel DPCH.

The transmission amplitude of the two antennas in a slot n is represented by the following equation.

$$A_{1,n} = A_{2,n} = \frac{1}{\sqrt{2}}$$

The transmission carrier phases of the two antennas are represented by the following equations.

$$\phi_{1,n} = 0$$

$$\phi_{2,n} = \{\pm\pi/4, \pm 3\pi/4\}$$

In the mobile station apparatus 100, the phase comparing unit 120 estimates received carrier phases of CPICHs transmitted from the two antennas and the FBI bit generating unit 160 generates a FBI bit in the slot n. The estimated values of received carrier phases represented by the followings:

$$\theta_{1,n}^{CP}$$

$$\theta_{2,n}^{CP}$$

are expressed by the following equation for an even slot n:

if $-\pi/2 \leq (\theta_{1,n}^{CP} - \theta_{2,n}^{CP}) \leq \pi/2$ then $b_n = 0$, otherwise $b_n = 1$ and by the following equation for an odd slot n:

if $0 \leq (\theta_{1,n}^{CP} - \theta_{2,n}^{CP}) \leq \pi$ then $b_n = 0$, otherwise $b_n = 1$ A result of decoding using the FBI bit, represented by:

$$\hat{b}_n$$

(where no FBI bit error is found, the decoding result is expressed by the following equation:

$$\hat{b}_n = b_n$$

)

is used by the wireless base station apparatus 200 to determine an interim transmission carrier phase in a DPCH slot (n+1) of the second antenna:

$$\phi_{2,(n+1)}$$

The interim transmission carrier phase is determined as follows: where n is an even number, the interim transmission carrier phase is determined by the following equation:

if $\hat{b}_n = 0$ then $\phi_{2,(n+1)} = 0$, otherwise $\phi_{2,(n+1)} = \pi$ and, where n is an odd number, the interim transmission carrier phase is determined by the following equation:

if $\hat{b}_n=0$ then $\phi_{2,(n+1)}=\pi/2$, otherwise $\phi_{2,(n+1)}=-\pi/2$

Thereafter, from the interim transmission carrier phases in the slots n and (n+1), a transmission carrier phase in the slot (n+1) of the second antenna represented by $\phi_{2,(n+1)}$ is ultimately obtained by the following equation:

$\phi_{2,(n+1)}=(\phi_{2,n}+\phi_{2,(n+1)})/2$

A FBI bit may be erroneous in an uplink. In such a case, the wireless base station apparatus 200 transmits signals with carrier phases that are different from a control command from the mobile station apparatus 100, and appropriate phase control cannot be carried out, resulting in an increase in an error rate. In order to solve this problem, antenna verification is conducted in the mobile station apparatus 100 to estimate a transmission weight (a transmission carrier phase) in each slot of DPCH. An example of antenna verification is described in, for example, TS25.214 Annex A.1 Antenna verification.

In an uplink, it is general that transmission power is controlled to ensure a consistent performance. As a result, the probability of occurrence of FBI bit errors is also consistent. Therefore, with abovementioned antenna verification process, downlink characteristics are improved.

Antenna verification is a function of correcting a phase control error due to an erroneous FBI bit in an uplink. However, antenna verification may mistakenly lead to a determination that there is a phase control error even though a FBI bit is correct in an uplink, and downlink transmission is carried out with an appropriate phase. In such a case, the mobile station apparatus 100 receives signals based on wrong determination information about a phase even though transmission is carried out with an appropriate phase, resulting in an increment in error rate. In other words, where there is an antenna verification error as above, a downlink wireless quality is deteriorated.

For a control method for the mobile station apparatus, the foregoing antenna verification may or may not be performed. When antenna verification is not performed, the mobile station apparatus assumes that there is no error in a FBI bit transmitted by itself, and receives signals in a downlink.

The descriptions above are about operations when transmission diversity is applied to a downlink dedicated physical channel DPCH. Now, descriptions below are about operations when closed-loop transmission diversity mode 1 is applied to a downlink shared channel, HS-PDSCH (High Speed Physical Downlink Shared Channel).

A HS-PDSCH is a shared physical channel for conveying data by a transmission scheme HSDPA (for example, see 3GPP "TS25.848 V4.0.0 Physical Layer Aspects of UTRA High Speed Downlink Packet Access.") for high-speed downlink data transmission. Other physical channels include a shared control channel HS-SCCH (High Speed Shared Control Channel), A-DPCH (Associated Dedicated Physical Channel), an associated dedicated channel set for each mobile station, and the like.

Similarly to a dedicated channel, transmission diversity in a HSDPA generates a FBI bit from a CPICH phase difference, transmits the FBI bit via an uplink DPCH, and controls a phase of HS-PDSCH from the second antenna. However, since HS-PDSCH does not have dedicated pilot symbols, antenna verification in the mobile station apparatus is carried out using dedicated pilot symbols of A-DPCH.

As described above, antenna verification of transmission diversity in HSDPA is carried out using a dedicated pilot of A-DPCH, an associated dedicated channel.

However, HS-PDSCH and A-DPCH have different TTI lengths, modulation schemes and the like. In addition, a coding method, a coding rate and the like of mapped HS-DSCH are largely different from those of DCH mapped to A-DPCH. Therefore, when antenna verification is carried out using a dedicated pilot of A-DPCH, deterioration may occur. To be more specific, there has been a problem in that a quality of a dedicated pilot of A-DPCH is not sufficiently high, and antenna verification errors thus increase, resulting in deterioration of qualify characteristics.

The present invention has accomplished in the light of the above problem, and an objective thereof is to provide a mobile station apparatus and a control method for the same, which prevent deterioration of characteristics due to an antenna verification error.

SUMMARY OF THE INVENTION

A first aspect of the present invention is to provide a mobile station apparatus communicating with a wireless base station apparatus to which closed-loop transmission diversity control is applied, the closed-loop transmission diversity control controlling phases of signals, transmitted from two antennas based upon feedback information notified by the mobile station apparatus and transmitting the signals, the mobile station apparatus, including a control unit which determines whether to reflect an estimated phase result of the signals transmitted from the two antennas or not, depending on a channel type of signals transmitted from the wireless base station apparatus.

A second aspect of the present invention is to provide a mobile station apparatus communicating with a wireless base station apparatus to which closed-loop transmission diversity control is applied, the closed-loop transmission diversity control controlling phases of signals transmitted form two antennas based upon feedback information notified by the mobile station apparatus and transmitting the signals, the mobile station apparatus, including a control unit which determines whether to reflect an estimated phase result of the signals transmitted by the two antennas or not, depending on a characteristic of pilot signals transmitted from the wireless base station apparatus.

A third aspect of the present invention is to provide a mobile station apparatus communicating with a wireless base station apparatus to which closed-loop transmission diversity control is applied, the closed-loop transmission diversity control controlling phases of signals transmitted form two antennas based upon feedback information notified by the mobile station apparatus and transmitting the signals, the mobile station apparatus, including a control unit which determines whether to reflect an estimated phase result of the signals transmitted from the two antennas or not, depending on reliability of the feedback information.

A forth aspect of the present invention is to provide a control method for a mobile station apparatus which communicating with a wireless base station apparatus to which closed-loop transmission diversity control is applied, the closed-loop transmission diversity control controlling phases of signals transmitted from two antennas based upon feedback information notified by the mobile station apparatus and transmitting the signals, the control method, including determining whether to reflect an estimated phase result of the signals transmitted from the two antennas or not, depending on a channel type of signals transmitted from the wireless

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Herein below, first to sixth embodiments of the present invention are described. The present invention can be applied to a mobile communication system including a wireless base station apparatus and a mobile station apparatus. Closed-loop transmission diversity control for controlling phases of signals transmitted by two antennas based upon feedback information notified by a mobile station and sending the signals is applied to the wireless base station apparatus. The mobile station apparatus, which communicates with the wireless base station apparatus includes a control unit (for example, an antenna verification function on/off control unit 70) for determining whether to reflect an estimated phase result (hereinafter, referred to as "antenna verification") of signals transmitted from the two antennas or not, in accordance with predetermined conditions described later.

First Embodiment

Described in the first embodiment are a mobile station apparatus and a control method for the same, where on/off switching of antenna verification is carried out depending on channel types. To be more specific, antenna verification is not performed for decoding of a shared channel such as HS-PDSCH, and is performed for decoding of a dedicated channel such as A-DPCH.

(Mobile Station Apparatus)

Figure 3:
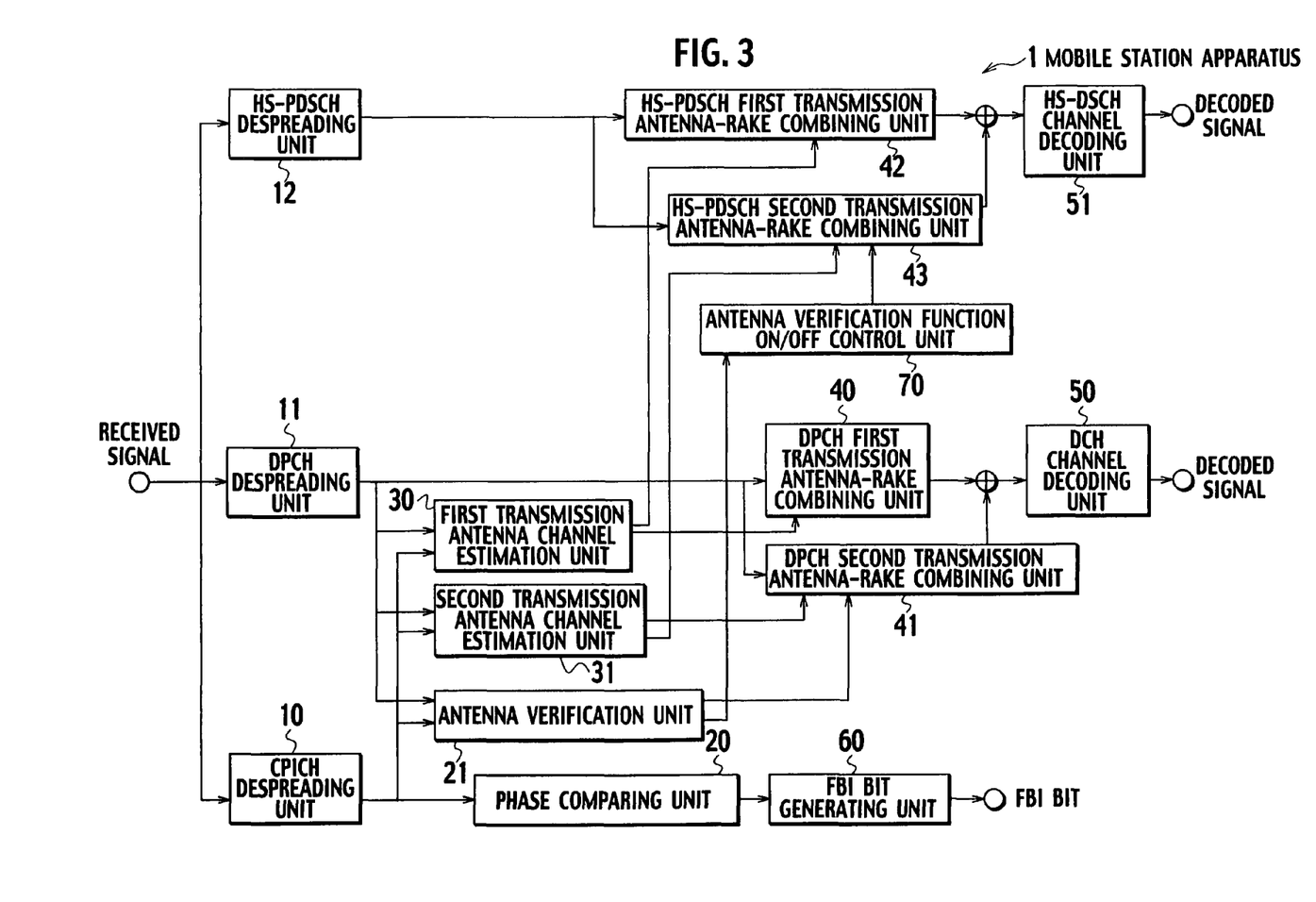
FIG. 3 is a structural block diagram of a mobile station apparatus according to first to sixth embodiments.

As shown in FIG. 3, a mobile station apparatus 1 (a receiving unit) according to the present invention includes a CPICH despreading unit 10, a DPCH despreading unit 11, a HS-PDSCH despreading unit 12, a phase comparing unit 20, an antenna verification unit 21, a first transmission antenna channel estimation unit 30, a second transmission antenna channel estimation unit 31, DPCH first transmission antenna-RAKE combining unit 40, a DPCH second transmission antenna-RAKE combining unit 41, a HS-PDSCH first transmission antenna-RAKE combining unit 42, a HS-PDSCH second transmission antenna-RAKE combining unit 43, a DCH channel decoding unit 50, a HS-DSCH channel decoding unit 51, a FBI bit generating unit 60, and an antenna verification function on/off control unit 70.

The CPICH despreading unit 10 despreads received signals for CPICH using a predetermined scrambling code and a CPICH channelization code, and outputs CPICH symbols obtained by the despreading to the phase comparing unit 20, an antenna verification unit 21, the first transmission antenna channel estimation unit 30, and the second transmission antenna channel estimation unit 31. The received signals mentioned above represents signals after amplification by a low noise amplifier, frequency conversion, linear amplification by an automatic gain control amplifier, quadrature detection, A/D conversion, a band limit by a route Nyquist filter, and the like are done.

The DPCH despreading unit 11 despreads received signals for DPCH using a predetermined scrambling code and a DPCH channelization code, and outputs DPCH symbols after the despreading to the DPCH first transmission antenna-RAKE combining unit 40 and the DPCH second transmission antenna-RAKE combining unit 41. The DPCH despreading unit 11 also outputs dedicated pilot symbols included in the DPCH symbols to the antenna verification unit 21. Further, the DPCH despreading unit 11 may output the dedicated pilot symbols to the first transmission antenna channel estimation unit 30 and the second transmission antenna channel estimation unit 31.

The HS-PDSCH despreading unit 12 despreads received signals for HS-PDSCH using a predetermined scrambling code and a HS-PDSCH channelization code, and outputs the HS-PDSCH symbols after the despreading to the HS-PDSCH first transmission antenna-RAKE combining unit 42 and the HS-PDSCH second transmission antenna-RAKE combining unit 43.

The phase comparing unit 20 determines a phase difference between signals transmitted from the first transmission antenna and the second transmission antenna, using the CPICH symbols inputted from the CPICH despreading unit 10.

The antenna verification unit 21 performs antenna verification using the CPICH symbols inputted by the CPICH despreading unit 10 and the dedicated pilot symbols from the DPCH despreading unit 11, and estimates a weighted coefficient that multiplies the signals from the second transmission antenna. Thereafter, the antenna verification unit 21 outputs the estimated result of a weighted coefficient, in other words, an antenna verification result to the DPCH second transmission antenna-RAKE combining unit 41 and the antenna verification function on/off control unit 70.

The first transmission antenna channel estimation unit 30 obtains an estimated channel value of signals transmitted from the first transmission antenna using the CPICH symbols inputted by the CPICH despreading unit 10. And The first transmission antenna channel estimation unit 30 outputs the estimated channel value of the first transmission antenna to the DPCH first transmission antenna-RAKE combining unit 40 and the HS-PDSCH first transmission antenna-RAKE combining unit 42. Here, the estimated channel value of signals from the first transmission antenna may be calculated using not only CPICH symbols but also dedicated pilot symbols inputted from the DPCH despreading unit 11.

The second transmission antenna channel estimation unit 31 obtains an estimated channel value of signals transmitted from the second antenna using CPICH symbols inputted by the CPICH despreading unit 10. And the second transmission antenna channel estimation unit 31 outputs the estimated channel value of the second transmission antenna to the DPCH second transmission antenna-RAKE combining unit 41 and the HS-PDSCH second transmission antenna-RAKE combining unit 43. Here, the estimated channel value of signals from the second transmission antenna may be calculated using not only the CPICH symbols but also the dedicated pilot symbols received from the DPCH despreading unit 11.

The DPCH first antenna-RAKE combining unit 40 receives the DPCH symbols of the first transmission antenna from the DPCH despreading unit 11, and also receives the estimated channel vale of the first transmission antenna from the first transmission antenna channel estimation unit 30. The DPCH first transmission antenna-RAKE combining unit 40 then carries out RAKE combining for the DPCH symbols transmitted from the first transmission antenna, and then outputs signals after the RAKE combining to the DCH channel decoding unit 50.

The DPCH second antenna-RAKE combining unit 41 receives the DPCH symbols of the second transmission antenna from the DPCH despreading unit 11, the estimated channel value of signals transmitted by the second transmission antenna from the second antenna channel estimation unit 31, and the antenna verification result from the antenna verification unit 21. The DPCH second antenna-RAKE combining unit 41 carries out RAKE combining for the DPCH symbols from the second transmission antenna and outputs signals after the RAKE combining to the DCH channel decoding unit 50. Here, a transmission antenna weight, which multiplies transmission signals, is reflected to the RAKE combining, and the antenna verification result is reflected to the antenna weight.

The HS-PDSCH first transmission antenna-RAKE combining unit 42 receives the HS-PDSCH symbols of the first transmission antenna from the HS-PDSCH despreading unit 12 and also receives the estimated channel value of signals transmitted by the first transmission antenna from the first transmission antenna channel estimation unit 30. Thereafter, the HS-PDSCH first transmission antenna-RAKE combining unit 42 performs RAKE combining for the HS-PDSCH symbols transmitted from the first transmission antenna and outputs signals after RAKE combining to the HS-DSCH channel decoding unit 51.

The HS-PDSCH second transmission antenna-RAKE combining unit 43 receives the HS-PDSCH symbols of the second transmission antenna from the HS-PDSCH despreading unit 12, the estimated channel value of signals transmitted by the second transmission antenna from the second transmission antenna channel estimation unit 31, and the antenna verification result from the antenna verification on/off control unit 70. The HS-PDSCH second transmission antenna-RAKE combining unit 43 then performs RAKE combining for the HS-PDSCH symbols transmitted from the second transmission antenna and outputs signals after the RAKE combining to the HS-DSCH channel decoding unit 51. Here, a transmission antenna weight that multiplies transmitted signals is reflected to the RAKE combining, and the antenna verification result is reflected to the antenna weight. Note that when the antenna verification function on/off control unit 70 determines that antenna verification is off, no antenna verification result is received. Therefore, the HS-PDSCH second transmission antenna-RAKE combining unit 43 performs RAKE combining using an antenna weight obtained when the antenna verification is off.

The DPCH channel decoding unit 50 receives the DPCH symbols of the first transmission antenna after the RAKE combining from the DPCH first transmission antenna-RAKE combining unit 40, and also receives the DPCH symbols of the second transmission antenna after the RAKE combining from the DPCH second transmission antenna-RAKE combining unit 41. After combining the DPCH symbols from the first and second transmission antennas, the DPCH channel decoding unit 50 carries out channel decoding. Here, channel decoding represents, for example, convolutional decoding and turbo decoding and is dependant on a channel coding method on the transmission side.

The HS-DSCH channel decoding unit 51 receives the HS-PDSCH symbols of the first transmission antenna after the RAKE combining from the HS-PDSCH first transmission antenna-Rake combining unit 42, and also receives HS-PDSCH symbols of the second transmission antenna after RAKE combining from the HS-PDSCH second transmission antenna-RAKE combining unit 43. After combining the HS-PDSCH symbols from the first and second transmission antennas, the HS-DSCH channel decoding unit 51 carries out channel decoding. Here, HS-DSCH mapped to HS-PDSCH is coded on the transmission side using a turbo code. Therefore, the channel decoding here is turbo decoding.

FBI bit generation unit 60 receives a determination result of a phase difference between signals from the first transmission antenna and the second transmission antenna from the phase comparing unit 20, and generates a FBI bit.

The antenna verification function on/off control unit 70 receives an antenna verification result from the antenna verification unit 21. Here, the antenna verification function on/off control unit 70 performs control so that the antenna verification result is reflected to demodulation of DPCH but not reflected the antenna verification result to demodulation of HS-PDSCH. Therefore, the antenna verification result is not transmitted to the HS-PDSCH second transmission antenna-RAKE combining unit 43. As a result of this control, antenna verification is conducted for a dedicated channel DPCH and is not conducted for a shared channel HS-PDSCH.

According to FIG. 3, what is controlled is whether to or not to transmit an antenna verification result for a shared channel HS-PDSCH. Instead, transmission of an antenna verification result regarding a dedicated channel DPCH may be controlled. In other words, the antenna verification function on/off control unit 70 may have control over whether to or not to transmit an antenna verification result to the DPCH second transmission antenna-RAKE combining unit 41 instead of to the HS-PDSCH second transmission antenna-RAKE combining unit 43.

(Control Method for Mobile Station Apparatus)

Figure 4:
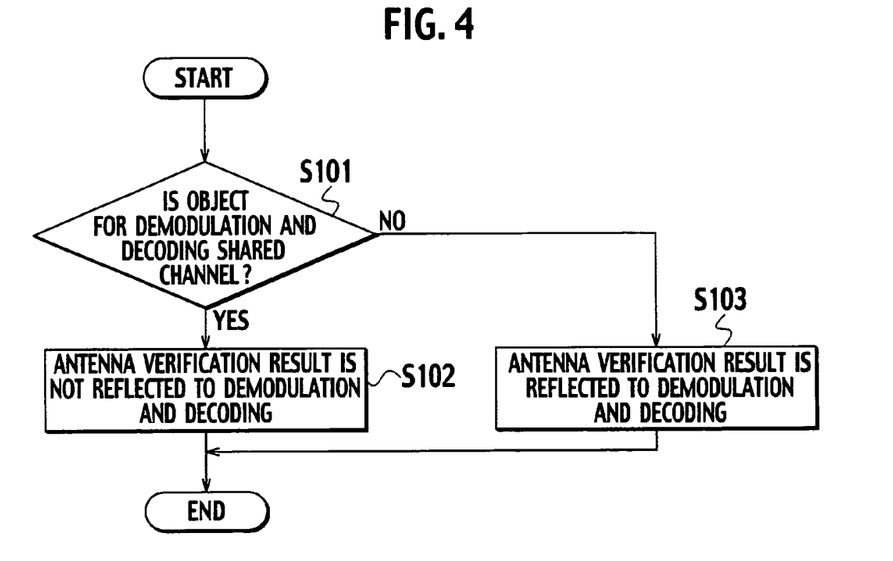
FIG. 4 is a flowchart showing a control method for the mobile station apparatus according to the first embodiment.

Next, a control method for the mobile station apparatus 1 according to the first embodiment is described with reference to FIG. 4.

First of all, in step S101, the mobile station apparatus 1 determines whether an object to be demodulated and decoded is a shared channel. Where the object for demodulation and decoding is determined to be a shared channel, the process proceeds to step S102. Where the object is determined not to be a shared channel, the process proceeds to step S103. Here, a shared channel represents, for example, HS-PDSCH (HS-DSCH as a transport channel), and a non-shared channel represents, for example, DPCH.

Next, in step S102, the mobile station apparatus 1 demodulates and decodes the channel without reflecting an antenna verification result.

Meanwhile, in step S103, the mobile station apparatus 1 demodulates and decodes the channel, reflecting an antenna verification result.

In this embodiment, what is controlled is whether to reflect an antenna verification result depending upon whether the channel is a shared channel or not. However, the same control can be carried out depending on other type of channel than shared channel.

(Operation and Effect)

According to the mobile station apparatus and the control method for the same of the first embodiment, what is controlled is whether to reflect an antenna verification result to demodulation and decoding depending on channel type. Accordingly, antenna verification result is reflected to demodulation and decoding when a channel's characteristics are improved once the antenna verification is reflected, and antenna verification result is not reflected to demodulation and decoding when a channel's characteristics are improved once no antenna verification result is reflected. As a result, an error rate of each channel can be reduced.

To be more specific, where a channel is a shared packet channel such as High Speed Physical Downlink Shared Channel, an antenna verification result is not reflected, and, where a channel is a dedicated channel such as Associated Dedicated Physical Channel or Dedicated Physical Channel, an antenna verification result can be reflected.

Second Embodiment

Deterioration of characteristics caused by an antenna verification error largely depends on quality of a dedicated pilot of A-DPCH. The second embodiment describes a mobile station apparatus and a control method for the same, which switch between on and off for antenna verification based upon SIR of dedicated pilot symbols.

(Mobile Station Apparatus)

As shown in FIG. 3, a mobile station apparatus 1 (a receiving unit) according to the second embodiment includes a CPICH despreading unit 10, a DPCH despreading unit 11, a HS-PDSCH despreading unit 12, a phase comparing unit 20, an antenna verification unit 21, a first transmission antenna channel estimation unit 30, a second transmission antenna channel estimation unit 31, DPCH first transmission antenna-RAKE combining unit 40, a DPCH second transmission antenna-RAKE combining unit 41, a HS-PDSCH first transmission antenna-RAKE combining unit 42, a HS-PDSCH second transmission antenna-RAKE combining unit 43, a DCH channel decoding unit 50, a HS-DSCH channel decoding unit 51, a FBI bit generating unit 60, and an antenna verification function on/off control unit 70.

The antenna verification function on/off control unit 70 obtains SIR of dedicated pilot symbols mapped to DPCH. Thereafter, where SIR of the dedicated pilot symbols is larger than a predetermined threshold, the antenna verification function on/off control unit 70 transmits an antenna verification result to HS-PDSCH second transmission antenna-RAKE combining unit 43. Where SIR of the dedicated pilot symbols is equal to or smaller than the predetermined threshold, the antenna verification function on/off control unit 70 does not transmit an antenna verification result to the HS-PDSCH second antenna-RAKE combining unit 43. Here, SIR of the dedicated pilot symbols is generated by, for example, the antenna verification unit 21 and notified to the antenna verification function on/off control unit 70.

The rest of the functions of the mobile station apparatus 1 are similar to those of the first embodiment and the descriptions thereof are thus omitted.

(Control Method for Mobile Station Apparatus)

Figure 5:
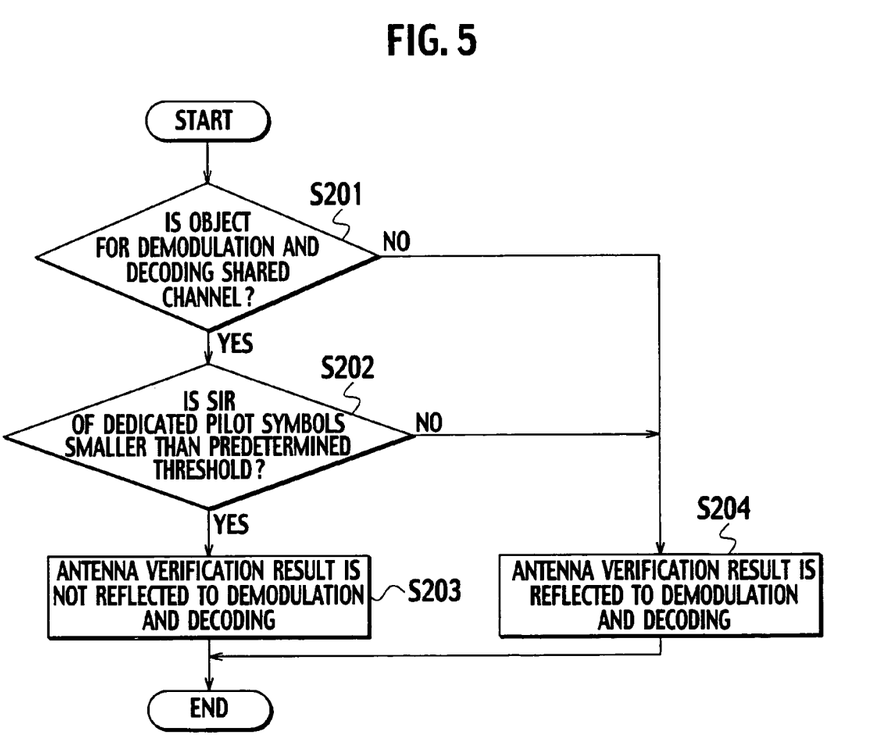
FIG. 5 is a flowchart showing a control method for the mobile station apparatus according to the second embodiment.

Next, a control method for the mobile station apparatus 1 according to the second embodiment is described with reference to FIG. 5.

First of all, in step S201, the mobile station apparatus 1 determines whether an object to be demodulated and decoded is a shared channel. Where the object to be demodulated and decoded is determined to be a shared channel, the process proceeds to step S202, and, where the object is determined not to be a shared channel, the process proceeds to S204. Here, the shared channel represents, for example, HS-PDSCH (HS-DSCH as a transport channel), and non-shared channel represents, for example, DPCH.

Next, in step S202, the mobile station apparatus 1 compares SIR of dedicated pilot symbols to a predetermined threshold. Where SIR is smaller than the predetermined threshold, the process proceeds to step S203, and, where SIR is equal to or larger than the predetermined threshold, the process proceeds to step S204.

In step S203, the mobile station apparatus 1 demodulates and decodes the channel without reflecting an antenna verification result.

Meanwhile, in step S204, the mobile station apparatus 1 demodulates and decodes the channel, reflecting an antenna verification result.

Note that, in step S201, it is determined whether a channel is a shared channel or not, but the determination can be omitted. Moreover, the predetermined threshold in step S202 may be set for each channel.

Furthermore, whether to or not to reflect an antenna verification result is determined based upon SIR of dedicated pilot symbols. However, any value may be used instead of SIR as long as it can work as an indicator of wireless performance of a dedicated pilot for a downlink.

Yet further, in the above description, the process proceeds to step S203 where the SIR is equal to the predetermined threshold in step S202. However, when SIR is equal to the predetermined threshold, the process may proceed to step S204.

(Operation and Effect)

According to the mobile station apparatus and the control method for the same of the second embodiment, what is controlled is whether to reflect an antenna verification result to demodulation and decoding depending on SIR of dedicated pilot symbols. Accordingly, antenna verification result is reflected to demodulation and decoding when the antenna verification result is highly accurate, and an antenna verification result is not reflected to demodulation and decoding when the antenna verification is low in accuracy. As a result, deterioration of characteristics of each channel due to an antenna verification error can be prevented, thus improving downlink characteristics such as BLER and throughput.

Third Embodiment

As described earlier, deterioration of characteristics due to an antenna verification error largely depends on a quality of a dedicated pilot of A-DPCH. The third embodiment describes a mobile station apparatus and a control method for the same, which switch between on and off for antenna verification based upon a power offset value of dedicated pilot symbols.

(Mobile Station Apparatus)

As shown in FIG. 3, a-mobile station apparatus 1 (a receiving unit) according to the third embodiment includes a CPICH despreading unit 10, a DPCH despreading unit 11, a HS-PDSCH despreading unit 12, a phase comparing unit 20, an antenna verification unit 21, a first transmission antenna channel estimation unit 30, a second transmission antenna channel estimation unit 31, DPCH first transmission antenna-RAKE combining unit 40, a DPCH second transmission antenna-RAKE combining unit 41, a HS-PDSCH first transmission antenna-RAKE combining unit 42, a HS-PDSCH second transmission antenna-RAKE combining unit 43, a DPCH channel decoding unit 50, a HS-DSCH channel decoding unit 51, a FBI bit generating unit 60, and an antenna verification function on/off control unit 70.

The antenna verification function on/off control unit 70 obtains a power offset value of dedicated pilot symbols mapped to DPCH. Where the power offset value of the dedicated pilot symbols is larger than a predetermined threshold, the antenna verification function on/off control unit 70 transmits the antenna verification result to the HS-PDSCH second transmission antenna-RAKE combining unit 43. Where the power offset value is equal to or smaller than the predetermined threshold, the antenna verification function on/off control unit 70 does not transmit the antenna verification result to the HS-PDSCH second transmission antenna-RAKE combining unit 43. Here, the power offset value of the dedicated pilot symbols represent a power offset value applied to the dedicated pilot symbols on the transmission side, and is notified by signaling by an upper layer to the mobile station apparatus 1.

The rest of the functions of the mobile station apparatus 1 are similar to those of the first embodiment, and the descriptions thereof are thus omitted.

(Control Method for Mobile Station Apparatus)

Figure 6:
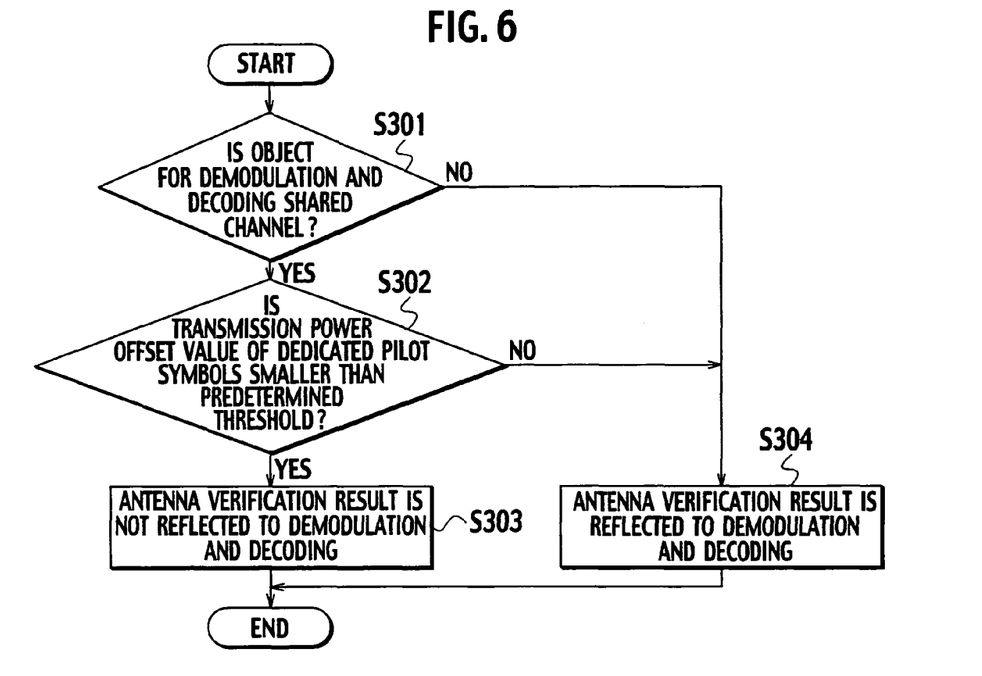
FIG. 6 is a flowchart showing a control method for the mobile station apparatus according to the third embodiment.

Next, a control method for the mobile station apparatus 1 according to the third embodiment is described with reference to FIG. 6.

First of all, in step S301, the mobile station apparatus 1 determines whether an object to be demodulated and decoded is a shared channel. Where the object for demodulation and decoding is determined to be a shared channel, the process proceeds to step S302, and, where the object is determined not to be a shared channel, the process proceeds to step S304. Here, the shared channel represents, for example, HS-PDSCH (HS-DSCH as a transport channel), and a non-shared channel represents, for example, DPCH.

Next, in step S302, the mobile station apparatus 1 compares the transmission power offset value of the dedicated pilot symbols to a predetermined threshold. Where the transmission power offset value is smaller than the predetermined threshold, the process proceeds to step S303. Where the transmission power offset value is equal to or larger than the predetermined threshold, the process proceeds to step S304.

Next, in step S303, the mobile station apparatus 1 demodulates and decodes the channel without reflecting the antenna verification result.

Meanwhile, in step S304, the mobile station apparatus 1 demodulates and decodes the channel, reflecting antenna verification result.

Note that, in step S301, it is determined whether a channel is a shared channel or not, but the determination can be omitted. Moreover, the predetermined threshold in step S302 may be set for each channel.

Further, in the above description, the process proceeds to step S304 when the transmission power offset value is equal to the predetermined value in step S302. However, the process can proceed to step S303 when the transmission power offset value is equal to the predetermined threshold.

(Operation and Effect)

According to the mobile station apparatus and the control method for the same of the third embodiment, what is controlled is whether to reflect an antenna verification result depending on a transmission power offset value of dedicated pilot symbols. Accordingly, antenna verification result is reflected to demodulation and decoding when the antenna verification result is highly accurate, and an antenna verification result is not reflected to a channel when the antenna verification is low in accuracy. As a result, deterioration of characteristics of each channel due to an antenna verification error can be prevented, thus improving downlink characteristics such as BLER and throughput.

Fourth Embodiment

As described earlier, deterioration of characteristics due to an antenna verification error depends largely on quality of a dedicated pilot of A-DPCH. The fourth embodiment describes a mobile station apparatus and a control method for the same, which switch between on and off for antenna verification based upon reliability of a FBI bit in an uplink.

(Mobile Station Apparatus)

As shown in FIG. 3, a mobile station apparatus 1 (a receiving unit) according to the fourth embodiment includes a CPICH despreading unit 10, a DPCH despreading unit 11, a HS-PDSCH despreading unit 12, a phase comparing unit 20, an antenna verification unit 21, a first transmission antenna channel estimation unit 30, a second transmission antenna channel estimation unit 31, DPCH first transmission antenna-RAKE combining unit 40, a DPCH second transmission antenna-RAKE combining unit 41, a HS-PDSCH first transmission antenna-RAKE combining unit 42, a HS-PDSCH second transmission antenna-RAKE combining unit 43, a DPCH channel decoding unit 50, a HS-DSCH channel decoding unit 51, a FBI bit generating unit 60, and an antenna verification function on/off control unit 70.

The antenna verification function on/off control unit 70 obtains FBI bit reliability in an uplink mapped to DPCH. Where the FBI bit reliability in an uplink is larger than a predetermined threshold, the antenna verification function on/off control unit 70 does not transmit an antenna verification result to the HS-PDSCH second transmission antenna-RAKE combining unit 43. Where the reliability is equal to or smaller than the predetermined threshold, the antenna verification function on/off control unit 70 transmits the antenna verification result to the HS-PDSCH second antenna-RAKE combining unit 43.

Here, the uplink FBI bit reliability may be calculated by the mobile station apparatus 1, or the uplink FBI bit reliability may be notified by a wireless base station apparatus.

The rest of the functions of the mobile station apparatus 1 are similar to those in the first embodiment, and thus the descriptions thereof are thus omitted.

(Control Method for Mobile Station Apparatus)

Figure 7:
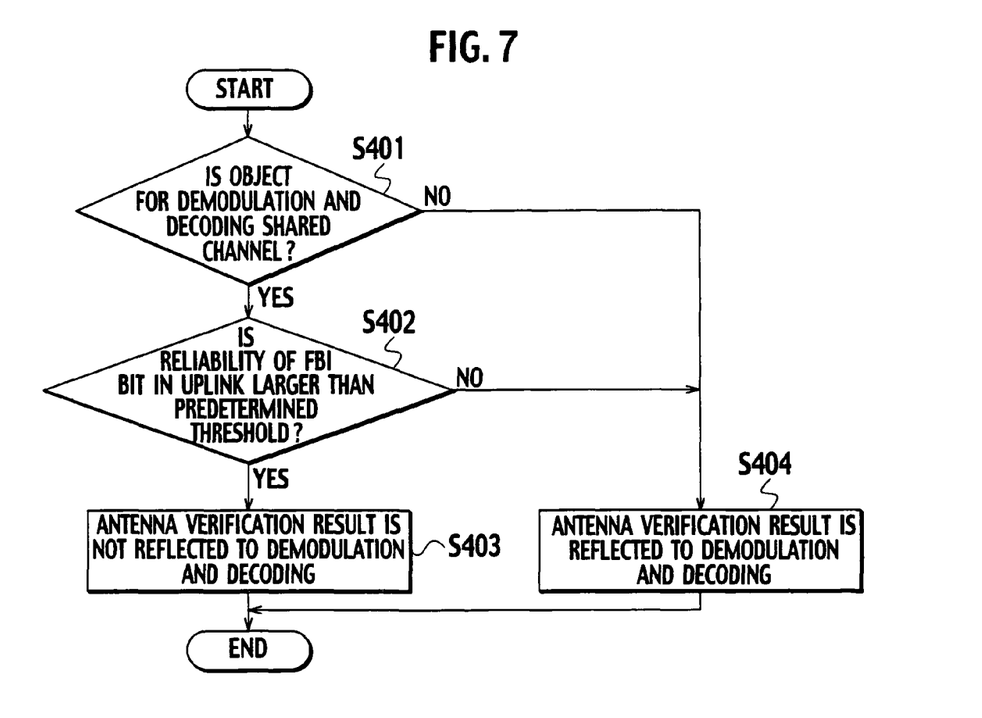
FIG. 7 is a flowchart showing a control method for the mobile station apparatus according to the fourth embodiment.

Next, the control method for the mobile station apparatus 1 according to the fourth embodiment is described with reference to FIG. 7.

First of all, in step S401, the mobile station apparatus 1 determines whether an object to be demodulated to decoded is a shared channel or not. Where the object for demodulation and decoding is determined to be a shared channel, the process proceeds to step S402, and, where the object is determined not to be a shared channel, the process proceeds to step S403. Here, the shared channel represents, for example, HS-PDSCH (HS-DSCH as a transport channel), and a non-shared channel represents, for example, DPCH.

Next, in step S402, the mobile station apparatus 1 compares FBI bit reliability in an uplink to a predetermined threshold. Where the reliability is larger than the predetermined threshold, the process proceeds to step S403. Where the reliability is equal to or smaller than the predetermined threshold, the process proceeds to step S404.

Next, in step S403, the mobile station apparatus 1 demodulates and decodes the channel without reflecting the antenna verification result.

Meanwhile, in step S404, the mobile station apparatus 1 demodulates and decodes the channel, reflecting the antenna verification result.

Note that, in step S401, it is determined whether a channel is a shared channel or not, but the determination can be omitted. Moreover, the predetermined threshold in step S402 may be set for each channel Further, in the above description, the process proceeds to S404 where the reliability is equal to the predetermined threshold in step S402. However, the process may proceed to step S403 instead.

Furthermore, in the above description, the process proceeds to S403 where the reliability is larger than the predetermined threshold in step S402. However, in step S402, where the reliability is smaller than the predetermined threshold, the process may proceed to step S403. Similarly, where the reliability is equal to or larger than the predetermined threshold, the process may proceed to step S404.

(Operation and Effect)

According to the mobile station apparatus and the control method for the same of the fourth embodiment, what is controlled is whether to reflect an antenna verification result depending on FBI bit reliability in an uplink. Accordingly, antenna verification result is reflected to demodulation and decoding of the channel when the antenna verification result is highly accurate, and an antenna verification result is not reflected to demodulation and decoding of a channel when the antenna verification is low in accuracy. As a result, deterioration of characteristics of each channel due to an antenna verification error can be prevented, thus improving downlink characteristics such as BLER and throughput.

Fifth Embodiment

In an environment where there is a large uplink error rate causing an increase in uplink FBI bit errors, effects that antenna verification produces is great. Therefore, it is significant to carry out antenna verification in such an environment, and improvements of characteristics can be achieved by switching between on and off of antenna verification depending upon an uplink environment. The fifth embodiment describes a mobile station apparatus and a control method for the same, which switch between on and off for antenna verification based upon a fading frequency.

(Mobile Station Apparatus)

As shown in FIG. 3, a mobile station apparatus 1 (a receiving unit) according to the fifth embodiment includes a CPICH despreading unit 10, a DPCH despreading unit 11, a HS-PDSCH despreading unit 12, a phase comparing unit 20, an antenna verification unit 21, a first transmission antenna channel estimation unit 30, a second transmission antenna channel estimation unit 31, DPCH first transmission antenna-RAKE combining unit 40, a DPCH second transmission antenna-RAKE combining unit 41, a HS-PDSCH first transmission antenna-RAKE combining unit 42, a HS-PDSCH second transmission antenna-RAKE combining unit 43, a DPCH channel decoding unit 50, a HS-DSCH channel decoding unit 51, a FBI bit generating unit 60, and an antenna verification function on/off control unit 70.

The antenna verification function on/off control unit 70 estimates a fading frequency in a propagation environment. Where the fading frequency is larger than a predetermined threshold, the antenna verification function on/off control unit 70 transmits an antenna verification result to the HS-PDSCH second transmission antenna-RAKE combining unit 43. Where the fading frequency is equal to or smaller than the predetermined threshold, the antenna verification function on/off control unit 70 does not transmit the antenna verification result to the HS-PDSCH second transmission antenna-RAKE combining unit 43.

The rest of the functions of the mobile station apparatus 1 are similar to those of the first embodiment, and the descriptions thereof are thus omitted.

(Control Method for Mobile Station Apparatus)

Figure 8:
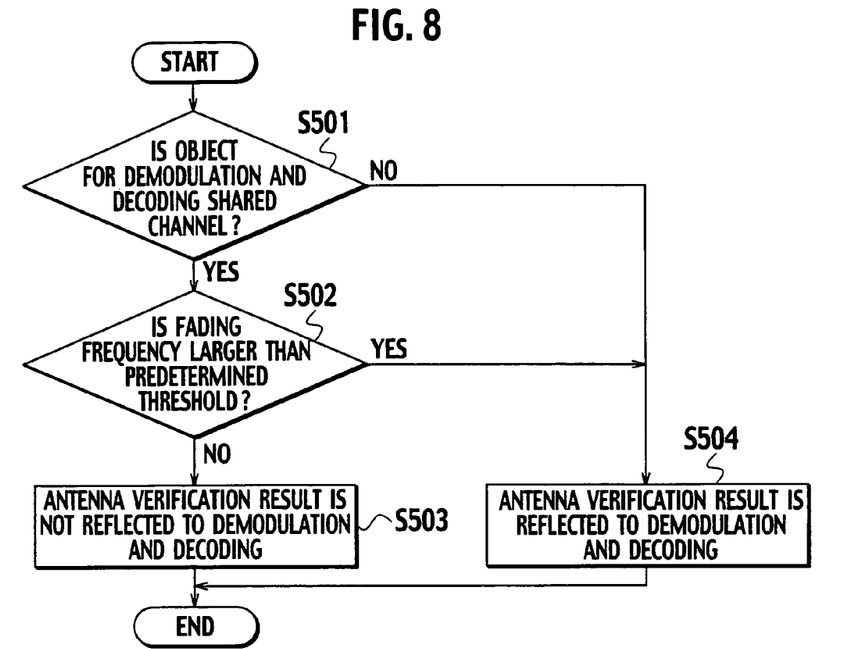
FIG. 8 is a flowchart showing a control method for the mobile station apparatus according to the fifth embodiment.

Next, a control method for a mobile station apparatus according to the fifth embodiment is described with reference to FIG. 8.

First of all, in step S501, the mobile station apparatus 1 determines whether an object to be demodulated and decoded is a shared cannel or not. Where the object for demodulation and decoding is determined to be a shared channel, the process proceeds to step S502, and, where the object is determined not to be a shared channel, the process proceeds to step S504. Here, the shared channel represents, for example, HS-PDSCH (HS-DSCH as a transport channel), and a non-shared channel represents, for example, DPCH.

Next, in step 502, the mobile station apparatus 1 estimates a fading frequency. Where the fading frequency is larger than a predetermined threshold, it is determined that FBI bit reliability in an uplink is small and the process proceeds to step S504. Where the fading frequency is equal to or smaller than the predetermined threshold, it is determined that the FBI bit reliability in an uplink is high, and the process proceeds to step S503.

Next, in step S503, the mobile station apparatus 1 demodulates and decodes the channel without reflecting an antenna verification result.

Meanwhile, in step S504, the mobile station apparatus 1 demodulates and decodes the channel, reflecting an antenna verification result.

Note that, in step S501, it is determined whether a channel is a shared channel or not, but the determination can be omitted. Moreover, the predetermined threshold in step S502 may be set for each channel Further, in the above description, the process proceeds to S504 where the fading frequency is equal to the predetermined threshold in step S502. However, the process may proceed to step S503 when the fading frequency is equal to the predetermined threshold.

Furthermore, in the above description, the process proceeds to S504 where the fading frequency is larger than a predetermined threshold in step S502. However, in step S502, where the fading frequency is larger than a predetermined threshold, the process may proceed to step S503. Similarly, where the fading frequency is equal to or smaller than the predetermined threshold, the process may proceed to step S504.

(Operation and Effect)

According to the mobile station apparatus and the control method for the same of the fifth embodiment, what is controlled is whether to reflect an antenna verification result depending on a fading frequency. Accordingly, antenna verification result is reflected to a channel when the antenna verification result is highly accurate, and an antenna verification result is not reflected to a channel when the antenna verification is low in accuracy. As a result, deterioration of characteristics of each channel due to an antenna verification error can be prevented, thus improving downlink characteristics such as BLER and throughput.

Sixth Embodiment

As described earlier, by switching between on and off for antenna verification depending on an uplink environment, characteristics can be improved. The sixth embodiment describes a mobile station apparatus and a control method for the same, which switch between on and off for antenna verification depending on the number of wireless base station apparatuses with which the mobile station apparatus 1 communicates.

(Mobile Station Apparatus)

As shown in FIG. 3, a mobile station apparatus 1 (a receiving unit) according to the sixth embodiment includes a CPICH despreading unit 10, a DPCH despreading unit 11, a HS-PDSCH despreading unit 12, a phase comparing unit 20, an antenna verification unit 21, a first transmission antenna channel estimation unit 30, a second transmission antenna channel estimation unit 31, DPCH first transmission antenna-RAKE combining unit 40, a DPCH second transmission antenna-RAKE combining unit 41, a HS-PDSCH first transmission antenna-RAKE combining unit 42, a HS-PDSCH second transmission antenna-RAKE combining unit 43, a DPCH channel decoding unit 50, a HS-DSCH channel decoding unit 51, a FBI bit generating unit 60, and an antenna verification function on/off control unit 70.

Where the mobile station apparatus 1 is communicating with a single wireless base station apparatus, the antenna verification function on/off control unit 70 does not transmit an antenna verification result to the HS-PDSCH second transmission antenna-RAKE combining unit 43. Where the mobile station apparatus 1 is communicating with a plurality of wireless base station apparatuses, the antenna verification function on/off control unit 70 transmits an antenna verification result to the HS-PDSCH second transmission antenna-RAKE combining unit 43.

The rest of the functions of the mobile station apparatus 1 are similar to those of the first embodiment, and the descriptions thereof are thus omitted.

(Control Method for Mobile Station)

Figure 9:
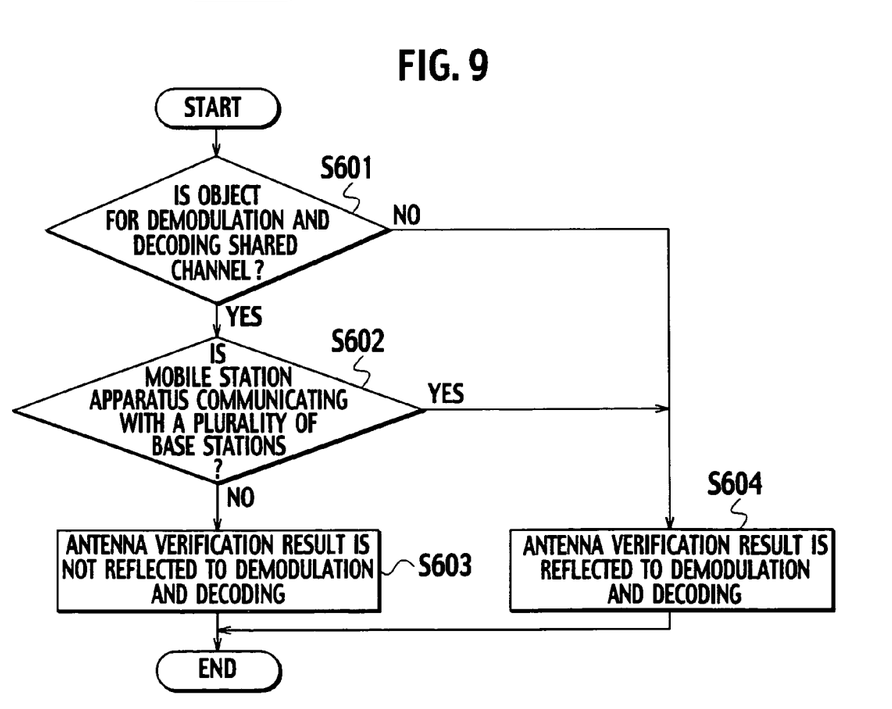
FIG. 9 is a flowchart showing a control method for the mobile station apparatus according to the sixth embodiment.

Next, the control method for the mobile station apparatus 1 according to the sixth embodiment is described with reference to FIG. 9.

First of all, in step S601, the mobile station apparatus 1 determines whether an object to be demodulated and decoded is a shared channel or not. Where the object for demodulation and decoding is determined to be a shared channel, the process proceeds to step S602, and, where the object is determined not to be a shared channel, the process proceeds to step S604. Here, the shared channel represents, for example, HS-PDSCH (HS-DSCH as a transport channel) and, a non-shared channel represents, for example, DPCH.

Next, while the mobile station apparatus 1 is communicating with a plurality of wireless base station apparatuses, the mobile station apparatus 1 determines that FBI bit reliability in an uplink is low, and the process proceeds to step S604. On the other hand, while communicating with a single wireless base station apparatus, the mobile station apparatus 1 determines that FBI bit reliability in an uplink is high, and the process proceeds to step S603. In general, when the mobile station apparatus is communicating with a plurality of wireless base station apparatuses, bits of the data part or receiving results after decoding are combined in a wireless control apparatus located in an upper level of the plurality of wireless base station apparatuses. However, FBI bits are not combined as above. Wireless quality of an uplink is controlled by wireless quality of the data part such as BLER, which results in that a FBI bit error rate is higher when the mobile station apparatus is communicating with a plurality of wireless base station apparatuses than when the mobile station apparatus is communicating with a single wireless base station apparatus.

Next, in step S603, the mobile station apparatus 1 demodulates and decodes the channel without reflecting an antenna verification result.

Meanwhile, in step S604, the mobile station apparatus 1 demodulates and decodes the channel, reflecting an antenna verification result.

Note that, in step S601, it is determined whether a channel is a shared channel or not, but the determination can be omitted.

Furthermore, in the above description, the process proceeds to S604 while the mobile station apparatus 1 is communicating with a plurality of wireless base station apparatuses in step S602. However, in step S602, while the mobile station apparatus 1 is communicating with a plurality of wireless base station apparatuses, the process may proceed to step S603. Similarly, while communicating with a single wireless base station apparatus, the process may proceed to step S604.

(Operation and Effect)

According to the mobile station apparatus and the control method for the same of the sixth embodiment, what is controlled is whether to reflect an antenna verification result depending on whether the mobile station apparatus 1 is communication with a plurality of wireless base station apparatuses. Accordingly, an antenna verification result is reflected to demodulation and decoding of a channel when the antenna verification result is highly accurate, and an antenna verification result is not reflected to demodulation and decoding of a channel when the antenna verification is low in accuracy. As a result, deterioration of characteristics of each channel due to an antenna verification error can be prevented, thus improving downlink characteristics such as BLER and throughput.

Other Embodiments

The present invention has been described according to the foregoing first to sixth embodiments. However, it should be understood that the description and drawings, which partially constitute the present disclosure do not limit this invention. From this disclosure, various alternative embodiments, embodiments and operational technologies will become apparent to those skilled in the art.

For example, in the first to sixth embodiments, high-speed packet transmission scheme HSDPA defined in 3GPP was described. However, the present invention is applied not only to HSDPA but also to communication schemes using transmission diversity in other types of mobile communication systems, such as CDMA2000 schemes, TDD schemes defined in 3GPP2. 111 Various modifications will become possible for those skilled in the art after receiving the teachings of the present disclosure without departing from the scope thereof.

What is claimed is:
1. A mobile station apparatus communicating with a wireless base station apparatus to which closed-loop transmission diversity control is applied, the closed-loop transmission diversity control controlling phases of signals transmitted from two antennas based upon feedback information notified by the mobile station apparatus and transmitting the signals, the mobile station apparatus comprising:
- a verification unit which estimates a weighted coefficient that multiplies signals from one of the two antennas; and
- a control unit which receives the estimated weighted coefficient from the verification unit and determines whether or not to apply the estimated weighted coefficient for use in demodulation of the signals transmitted by the two antennas, depending on a characteristic of dedicated pilot signals transmitted from the wireless base station apparatus, wherein when an indicator of wireless performance of the dedicated pilot signals is smaller than a predetermined threshold, the control unit determines not to apply the estimated weighted coefficient for use in demodulation.

2. The mobile station apparatus of claim 1, wherein the control unit determines whether or not to apply the estimated weighted coefficient for use in demodulation of the signals transmitted from the two antennas, depending on whether or not a channel type of signals transmitted from the wireless base station apparatus is a shared channel which requires performance of antenna verification by using a dedicated pilot of an associated channel.

3. The mobile station apparatus of claim 1, wherein the control unit does not apply the estimated weighted coefficient for demodulation of the signals when the channel type is a shared packet channel which is a channel shared by a plurality of mobile station apparatuses, and does apply the estimated weighted coefficient for demodulation of the signals when the channel type is a dedicated channel which is a channel dedicated to the mobile station apparatus.

4. The mobile station apparatus of claim 3, wherein the shared packet channel is a High Speed Physical Downlink Shared Channel.

5. The mobile station apparatus of claim 3, wherein the dedicated channel is an Associated Dedicated Physical Channel or a Dedicated Physical Channel.

6. The mobile station apparatus of claim 1, wherein the control unit determines whether or not to apply the estimated weighted coefficient for use in demodulation of the signals transmitted from the two antennas, depending on a reliability of the feedback information.

7. The mobile station apparatus of claim 6, wherein the reliability of the feedback information is determined by a fading frequency or the number of wireless base station apparatuses with which the mobile station apparatus communicates.

8. A control method for a mobile station apparatus which communicating with a wireless base station apparatus to which closed-loop transmission diversity control is applied, the closed-loop transmission diversity control controlling phases of signals transmitted from two antennas based upon feedback information notified by the mobile station apparatus and transmitting the signals, the control method comprising:
- estimating, at a verification unit of the mobile station apparatus, a weighted coefficient that multiplies signals from one of the two antennas; and
- receiving, at a control unit of the mobile station apparatus, the estimated weighted coefficient from the verification unit and determining whether or not to apply the estimated weighted coefficient for use in demodulation of the signals transmitted from the two antennas, depending on a characteristic of dedicated pilot signals transmitted from the wireless base station apparatus, wherein when an indicator of wireless performance of the dedicated pilot signals is smaller than a predetermined threshold, the control unit determines not to apply the estimated weighted coefficient for use in demodulation.

9. The mobile station apparatus of claim 1, wherein the indicator of wireless performance of the dedicated pilot signals is a signal to interference ratio (SIR) of the pilot signals or a power offset of the pilot signals.

* * * * *